United States Patent
Konishi et al.

[11] Patent Number: 5,974,024
[45] Date of Patent: *Oct. 26, 1999

[54] DISK HUB MOLDED FROM A HARD SYNTHETIC RESIN BLENDED WITH A FLUORORESIN, A DISK CARTRIDGE HOUSING A DISK HAVING SUCH A DISK HUB AND A DISK DRIVING DEVICE HAVING A SPINDLE COATED WITH A FLUORORESIN

[75] Inventors: Katsuyuki Konishi, Kashihara; Shoji Maekawa, Shiki-gun, both of Japan

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/684,091

[22] Filed: Jul. 19, 1996

[30] Foreign Application Priority Data

Aug. 15, 1995 [JP] Japan ..................................... 7-230719

[51] Int. Cl.⁶ ....................................................... G11B 7/24
[52] U.S. Cl. ............................................. 369/282; 369/290
[58] Field of Search ..................................... 369/282, 271, 369/289, 290; 360/133, 135

[56] References Cited

U.S. PATENT DOCUMENTS

| | | | |
|---|---|---|---|
| 5,020,207 | 6/1991 | Minoda et al. | 369/282 X |
| 5,226,033 | 7/1993 | Takahashi | 369/290 |
| 5,369,632 | 11/1994 | Takahashi | 369/282 |
| 5,438,564 | 8/1995 | Takahashi | 369/290 |
| 5,448,553 | 9/1995 | Suzuki et al. | 369/290 |

FOREIGN PATENT DOCUMENTS

| | | |
|---|---|---|
| 0449517 | 10/1991 | European Pat. Off. . |
| 59-227065 | 12/1984 | Japan . |
| 2-73583 | 3/1990 | Japan . |
| 2-183479 | 7/1990 | Japan . |
| 4-324155 | 11/1992 | Japan . |
| 7-262728 | 10/1995 | Japan . |

*Primary Examiner*—William R. Korzuch
*Attorney, Agent, or Firm*—Nixon & Vanderhye P.C.

[57] ABSTRACT

A disk hub of the present invention is provided with a hub's main body to which a magnetic plate is attached, an energy director for ultrasonically joining the disk, and a center hole to which a disk-drive spindle is inserted. The hub's main body, the energy director and the circumferential edge of the center hole are integrally molded into one part from a hard synthetic resin with which an abrasion-resistant resin in fine powder form such as, for example, fluororesin is blended. Thus, the friction resistance of the circumferential edge of the center hole is reduced, and abrasion of the center hole is also reduced even after repeated inserting and removing operations of the spindle into and from the center hole. Moreover, when, for example, poly-tetra-fluoroethylene, which is easily available at low costs, is used as the fluororesin, it becomes possible to provide an inexpensive disk hub, and also to reduce the friction resistance of the circumferential edge of the center hole effectively.

11 Claims, 10 Drawing Sheets

Fig. 3(a)
Fig. 3(b)
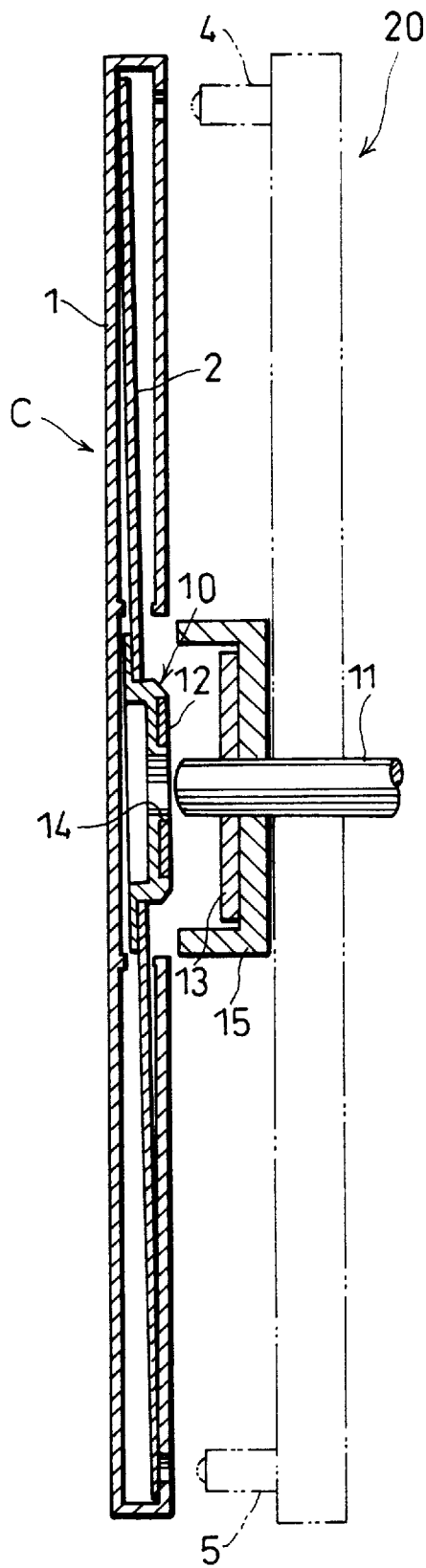
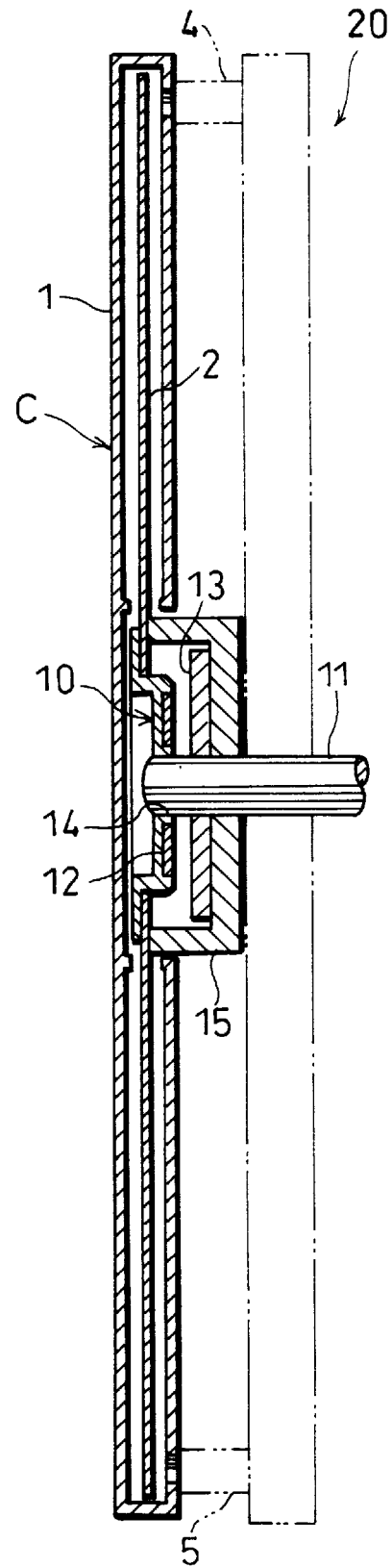

Electron-Microscopic Photograph of the
Resin Forming the Disk Hub (X200)

Electron-Microscopic Photograph of the
Resin Forming the Disk Hub (X500)

Electron-Microscopic Photograph of the
Resin Forming the Disk Hub (X1000)

Fig. 9(a) (PRIOR ART)
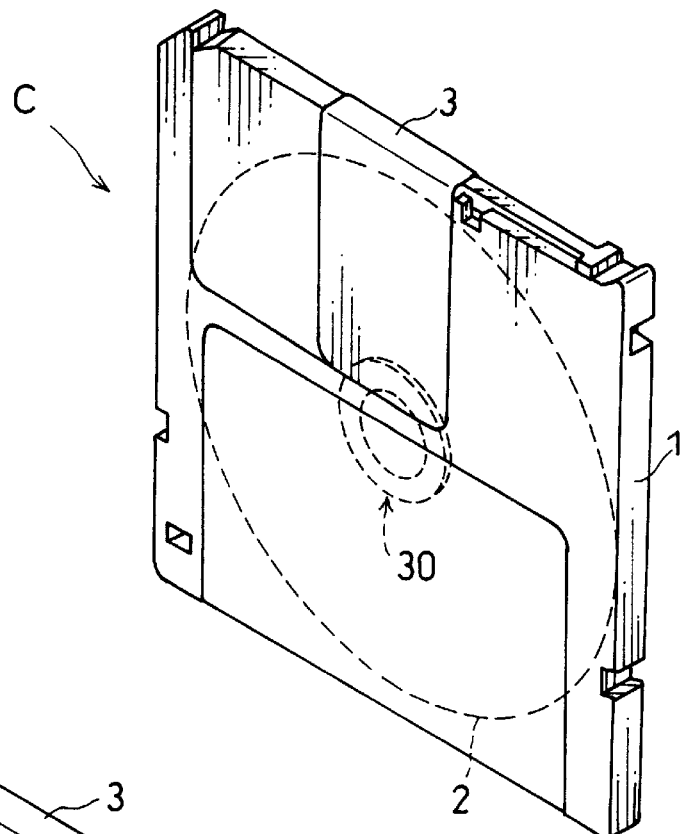
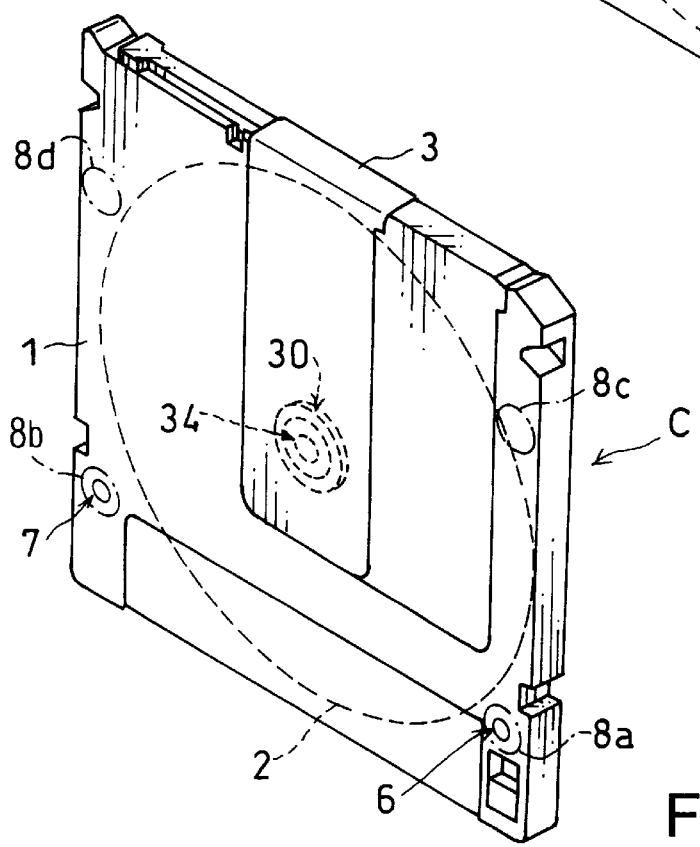
Fig. 9(b) (PRIOR ART)

Fig. 11(a)
(PRIOR ART)
Fig. 11(b)
(PRIOR ART)
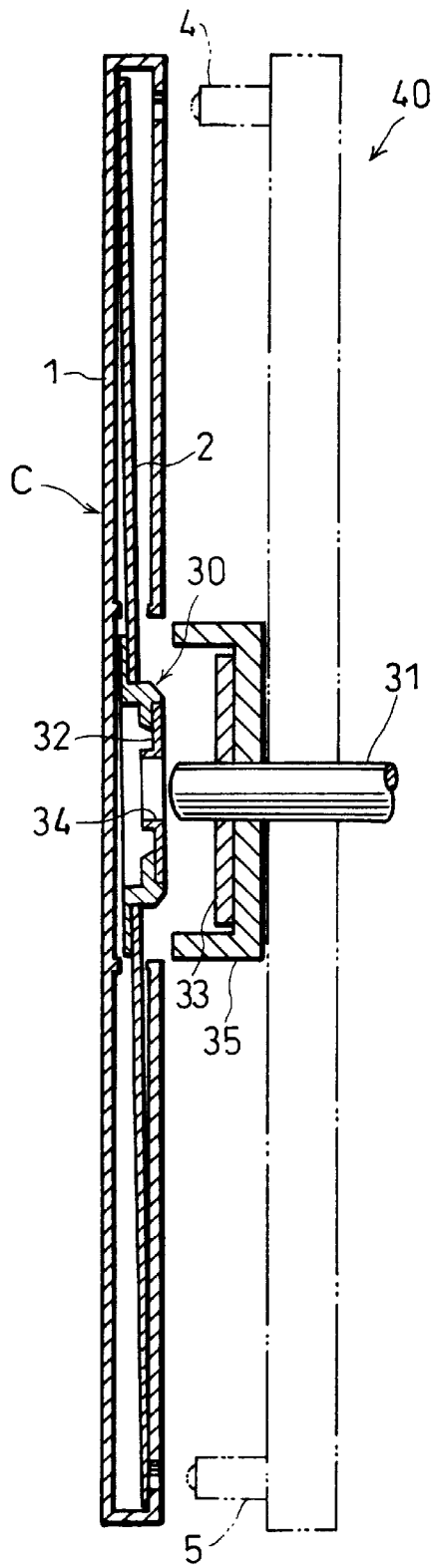
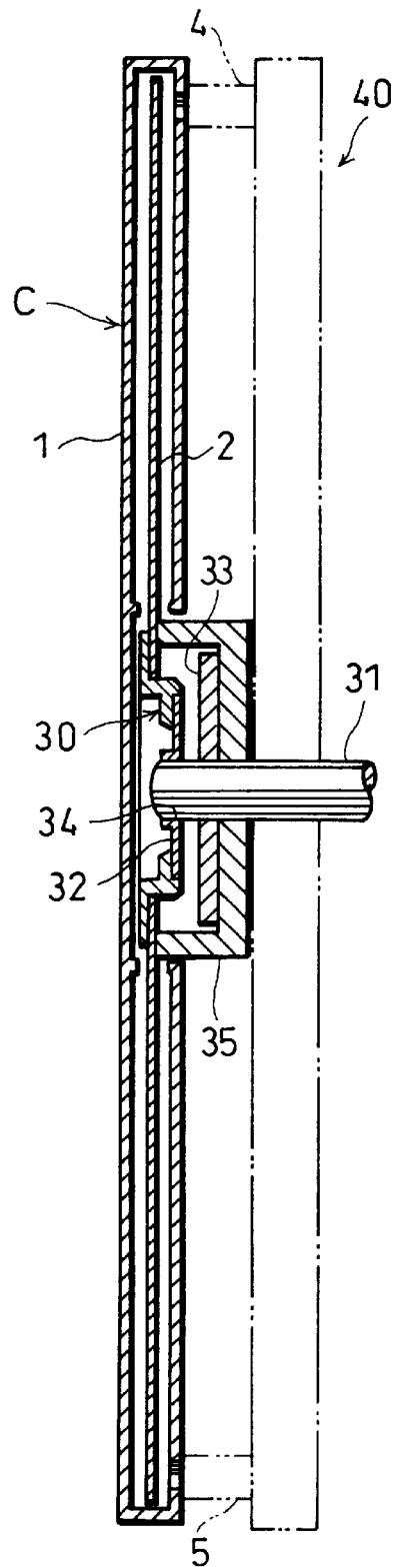

DISK HUB MOLDED FROM A HARD SYNTHETIC RESIN BLENDED WITH A FLUORORESIN, A DISK CARTRIDGE HOUSING A DISK HAVING SUCH A DISK HUB AND A DISK DRIVING DEVICE HAVING A SPINDLE COATED WITH A FLUORORESIN

FIELD OF THE INVENTION

The present invention relates to a disk hub that is placed at the center portion of an optical disk or a magnetic disk, a disk cartridge that houses a disk to which the hub is attached, and a disk driving device for rotationally driving the disk.

BACKGROUND OF THE INVENTION

FIG. 9(a) is a perspective view showing the appearance of a 3.5 inch magneto-optical disk cartridge C on its surface side, and FIG. 9(b) is a perspective view showing the appearance of the magneto-optical disk cartridge C on its rear-surface side.

As illustrated in FIGS. 9(a) and 9(b), a rotatable disk 2 is housed inside the cartridge case 1 of the magneto-optical disk cartridge C. Further, a shutter 3, which is free to slide laterally, is installed on the surface of the cartridge case 1. The shutter 3 is closed when the magneto-optical disk cartridge C has been removed from a disk driving device, not shown. Thus, it is possible to protect the disk 2 and its central driving section from dust and dirt, and also to protect them from damage.

Moreover, as illustrated in FIG. 9(b), a location hole 6 and an alignment hole 7 are provided in the rear-surface of the magneto-optical disk cartridge C. The location hole 6 has a perfectly round shape. Here, a positioning pin 4 (see FIG. 11), which is attached to a disk driving device 40 (see FIG. 11) that will be described later, is fitted to the location hole 6 so that the original position for the magneto-optical disk cartridge C is determined with respect to the disk driving device 40.

The alignment hole 7, on the other hand, is an elongated hole. A positioning pin 5 (see FIG. 11), which is attached to the disk driving device 40, is fitted to the alignment hole 7 so that the planar position of the magneto-optical disk cartridge C is determined with respect to the disk driving device 40. Moreover, reference surfaces 8a, 8b, 8c and 8d of the cartridge case 1 come into contact with respective receiving faces of the disk driving device 40 so that the position of the magneto-optical disk cartridge C is determined with respect to the rotation-axis direction of the disk driving device 40.

Here, the following structures are exemplified as a disk hub 30 that is attached to the disk 2. The disk hub 30 is fitted to a spindle 31 (see FIG. 11) for rotating the disk 2, and transmits the rotational driving force of the spindle 31 to the disk 2.

FIG. 10(a) shows one structural example of the disk hub 30 that is attached to a disk of 90 mm (3.5 inch). The main body 30a of the disk-use hub 30 is molded from polycarbonate resin. Further, a magnetic plate 32, made of a magnetic metal such as, for example, SUS (Stainless Steel)-430, is inserted into the hub's main body 30a during its molding process. Moreover, a center hole 34 is provided in the center of the magnetic plate 32 by a draw-bending process.

A flange 30b is integrally formed around the periphery of the hub's main body 30a. Here, an energy director 30c, which is used for ultrasonically joining the disk, is provided on one side face of the flange 30b in a protruding ring shape.

FIG. 10(b) shows another structural example of the disk hub 30 that is attached to a disk of 130 mm (5.25 inch). Here, the members that have the same functions as those used in the above-mentioned disk hub 30 attached to the disk of 90 mm are indicated by the same reference numbers.

The main body 30a of this disk hub 30 is molded from polycarbonate resin, and a magnetic plate 32 is inserted to the hub's main body 30a during its molding process. Further, a hole-formation member 30d, which is made of another type of resin having a lower friction resistance, is formed at the central portion of the magnetic plate 32 during its molding process so that the center hole 34 is provided. Here, an energy director 30c is integrally formed on the hub's main body 30a.

Referring to FIGS. 11(a) and 11(b), the following description will discuss processes during which the magneto-optical disk cartridge C is placed into the disk driving device 40.

When the magneto-optical disk cartridge C is inserted into the cartridge entrance (not shown) of the disk driving device 40 from its front portion (a portion at which the shutter 3 (see FIG. 9) is provided), the shutter 3 is first opened. Then, as the magneto-optical disk cartridge C is further inserted, the positioning pins 4 and 5 inside the disk driving device 40 are respectively fitted into the location hole 6 and the alignment hole 7 (both shown in FIG. 9) that are formed in the cartridge case 1.

Coinciding with this positioning operation, the disk hub 30, provided in the center of the disk 2 that has been housed in the magneto-optical disk cartridge C, is allowed to fit to the spindle 31 that is provided in the disk driving device 40 in the following manner.

As illustrated in FIG. 11(a), the magnetic plate 32, which is attached to the disk hub 30 of the disk 2 that is located in a disk-housing space inside the cartridge case 1, is attracted to a magnet 33 that is attached to the spindle 31, and then the center hole 34 of the disk hub 30 is inserted into the spindle 31. In this case, the disk 2, which is placed in the disk-housing space inside the cartridge case 1, is allowed to slide into the spindle 31, while the center hole 34 is being aligned by the tip of the spindle 31. Consequently, as illustrated in FIG. 11(b), the disk 2 comes into contact with a disk clamp 35 that is fitted into the spindle 31, thereby completing the inserting operation.

After completion of the inserting operation of the magneto-optical disk cartridge C, the spindle 31 and the disk clamp 35 fitted into the spindle 31 are allowed to rotate. Then, the rotational driving force of the spindle 31 is transmitted to the disk 2 that is being pressed against the disk clamp 35 by a magnetic force, and the disk 2 rotates at a predetermined speed.

Here, when the center hole 34 of the disk hub 30 slides into the spindle 31 to fit thereto while being aligned by the tip of the spindle 31, abrasion takes place between the tip of the spindle 31 and the open edge of the center hole 34. Further, when the magneto-optical disk cartridge C is drawn from the disk device, abrasion also takes place between the outer circumferential surface of the spindle 31 and the inner circumferential surface of the center hole 34.

Therefore, in the conventional disk hub 30 shown in FIG. 10(a), since the metal spindle 31 and the center hole 34 of the metal magnetic plate 32 contact each other, both of the members are subjected to abrasion every time the inserting or drawing operation is repeated. The resulting problem is that the alignment accuracy is lowered. Moreover, in the above-mentioned disk hub 30, dust is raised due to the abrasion, and the dust, scattered in the periphery, causes adverse effects on the optical system and mechanical system of the disk driving device 40.

In the conventional disk-use hub 30 shown in FIG. 10(b), on the other hand, the above-mentioned problem is alleviated, since the hub's main body 30a is molded from a resin material suitable for the joining to the disk 2, and since the center hole 34 is provided as the hole-formation member 30d that is made of another type of resin having a low-friction resistance. However, this disk hub 30 is expensive with a complicated structure, and the processing cost is also high since two types of resin materials are used.

SUMMARY OF THE INVENTION

The first objective of the present invention is to provide a disk hub which is easily manufactured at low costs and which can reduce abrasion of its center hole. Moreover, the second objective of the present invention is to provide a disk cartridge for housing a disk having the disk hub as well as a disk driving device for desirably driving the disk.

In order to achieve the first objective, the disk hub of the present invention, which has a hub's main body to which a magnetic plate is attached, an energy director for ultrasonically joining a disk, and a center hole to which a disk drive spindle is inserted, is characterized in that the hub's main body, the energy director and the circumferential edge of the center hole are integrally molded from a hard synthetic resin with which an abrasion-resistant resin in fine powder form is blended.

With this arrangement, the hub's main body, the energy director and the circumferential edge of the center hole are integrally molded easily by injecting the hard synthetic resin mixedly containing an abrasion-resistant resin in fine powder form into, for example, a simple metal mold. Therefore, the arrangement makes it possible to obtain a disk hub by using a simpler method than conventional methods.

Moreover, since the abrasion-resistant resin in fine powder form is blended with the hard synthetic resin, the abrasion-resistance of the circumferential edge of the center hole is reduced. Consequently, even if the disk drive spindle is repeatedly inserted and removed into and from the center hole, the abrasion of the spindle and the center hole is suppressed. Therefore, the above-mentioned arrangement makes it possible to prevent degradation of the alignment accuracy between the spindle and the center hole, and also to reduce generation of dust, thereby eliminating the adverse effects on the optical system and mechanical system of the disk driving device.

Furthermore, the abrasion-resistant resin in fine powder form, which is blended with the hard synthetic resin, is a material that is inherently difficult to be ultrasonically joined. However, in the hard synthetic resin, the abrasion-resistant resin in fine powder form is dispersed in a manner that resembles a group of islands; therefore, if the content of the abrasion-resistant resin is properly adjusted, no problem is raised when the disk is ultrasonically joined through the energy director. Therefore, even in the case when the abrasion-resistant resin in fine powder form is blended with the hard synthetic resin, the disk is positively joined to the hard synthetic resin.

moreover, it is possible to provide a low-friction coefficient in the center hole by using fluororesin as the abrasion-resistant resin. In this case, when the content of the fluororesin is great, the ultrasonical joining ability between the disk-use hub and the disk is lowered. However, if the content X of the fluororesin is set within $0 < X \leq 10$ [%] in its weight ratio to the hard synthetic resin (and more preferably within $0 < X \leq 5$ [%]), it becomes possible to obtain a joining strength that is sufficient in practical use, while reducing the friction resistance of the circumferential edge of the center hole sufficiently.

Moreover, when poly-tetra-fluoroethylene, which is easily available at comparatively low prices, is used as the fluororesin, it becomes possible to provide a comparatively inexpensive disk hub, and also to effectively reduce the friction resistance in the circumferential edge of the center hole.

Furthermore, in order to achieve second objective, the disk cartridge of the present invention is characterized in that a disk which has the above-mentioned disk hub is housed in a cartridge case.

With this arrangement, since the above-mentioned disk hub is adopted therein, it is possible to provide a disk cartridge which has higher performances than conventional cartridges.

Moreover, in order to achieve the second objective, the disk driving device of the present invention is characterized in that the disk-drive spindle is coated with fluororesin.

This arrangement provides superior abrasion-resistance to the spindle itself, and also makes the friction resistance of the spindle smaller. Thus, it becomes possible to reduce the abrasion of the spindle that is inserted and removed into and from the center hole.

In particular, in this case, when the disk hub is made of the hard synthetic resin mixedly containing the abrasion-resistant resin in fine powder form, the abrasion-resistance of the spindle itself is further improved, and to the extent that the friction resistance is reduced, the con tent of the abrasion-resistant resin can be cut correspondingly.

In the case when, for example, fluororesin is used as the abrasion-resistant resin, if the content X of the fluororesin is set within $0 < X \leq 3$ [%] in its weight ratio to the hard synthetic resin, it becomes possible to further increase the ultrasonic joining ability between the disk hub and the disk, while reducing the friction resistance of the circumferential edge of the center hole sufficiently.

For a fuller understanding of the nature and advantages of the invention, reference should be made to the ensuing detailed description taken in conjunction with the accompanying drawings.

BRIEF DESCRIPTION OF THE DRAWINGS

FIG. 3(a) is a longitudinal cross-sectional view that shows a state before the center hole of the disk-use hub is fitted to a spindle.

FIG. 3(b) is a longitudinal cross-sectional view that shows a state when the center hole of the disk hub has been fitted to the spindle.

FIG. 9(a) is a perspective view showing the appearance of a magneto-optical disk cartridge when seen from the surface side.

FIG. 9(b) is a perspective view showing the appearance of the magneto-optical disk cartridge when seen from the rear-surface side.

FIG. 11(a) is a longitudinal cross-sectional view that shows a state before the center hole of the conventional disk hub is fitted to a spindle.

FIG. 11(b) is a longitudinal cross-sectional view that shows a state when the center hole of the conventional disk hub has been fitted to the spindle.

DESCRIPTION OF THE EMBODIMENTS

Referring to FIGS. 1 through 8 the following description will discuss one embodiment of the present invention. Here, those members that have the same functions and that are described in the section of the prior art are indicated by the same reference numbers and the description thereof is omitted.

Figure 1A:
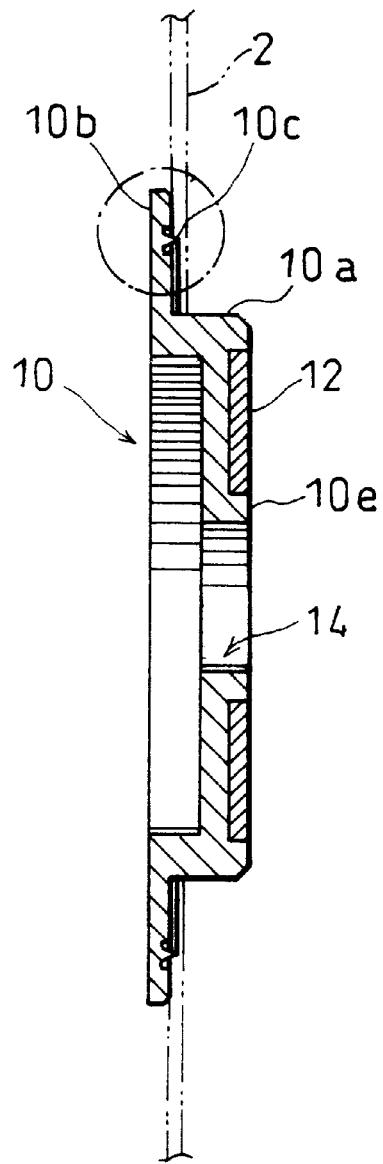
FIG. 1(a) is a longitudinal cross-sectional view showing a structural example of a disk hub of the present invention.
Figure 1B:
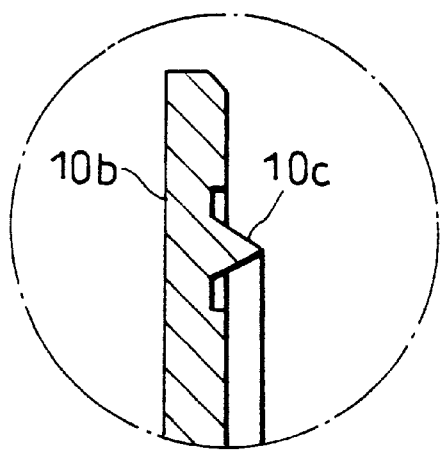
FIG. 1(b) is a longitudinal cross-sectional view of the peripheral portion of the main body of the disk hub.
Figure 1C:
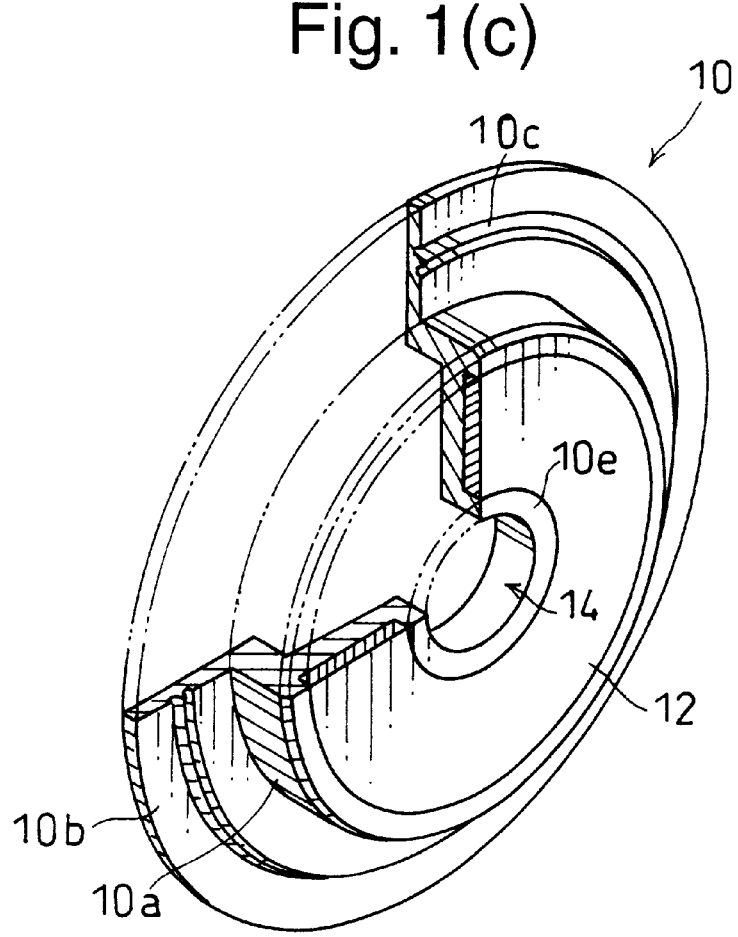
FIG. 1(c) is a perspective view showing the appearance of the disk hub one portion of which is exploded.

FIGS. 1(a) through 1(c) schematically show a structure of a disk hub 10 of the present invention which is attached to a disk 2 of 90 mm (3.5 inch). The disk hub 10 is constituted of a hub's main body 10a, a flange 10b, an energy director 10c for ultrasonically joining the disk 2, and a peripheral portion 10e that forms a center hole 14 to which a spindle 11 is inserted, as is shown in FIGS. 3(a) and 3(b). Here, these components are integrally molded from hard synthetic resin such as, for example, polycarbonate resin as one part by injection molding. Further, a magnetic plate 12, made of a magnetic metal such as, for example, SUS (Stainless Steel)-430, is inserted into the hub's main body 10a during its molding process.

Figure 2A:
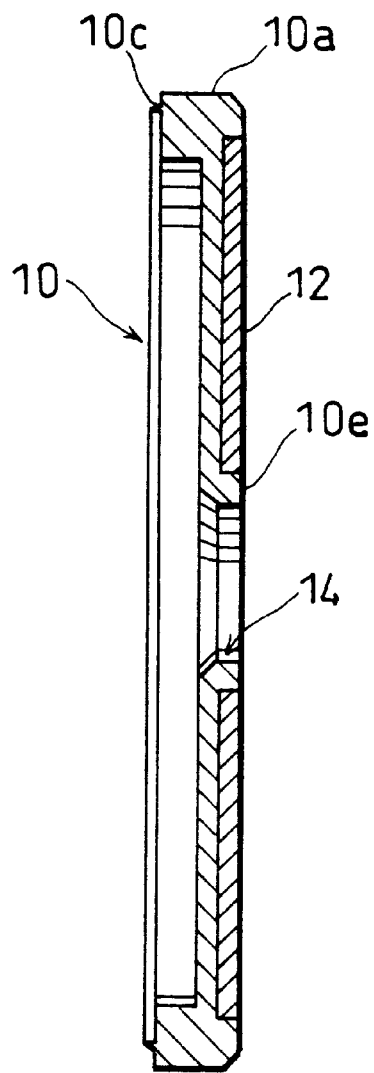
FIG. 2(a) is a longitudinal cross-sectional view showing another structural example of a disk hub of the present invention.
Figure 2B:
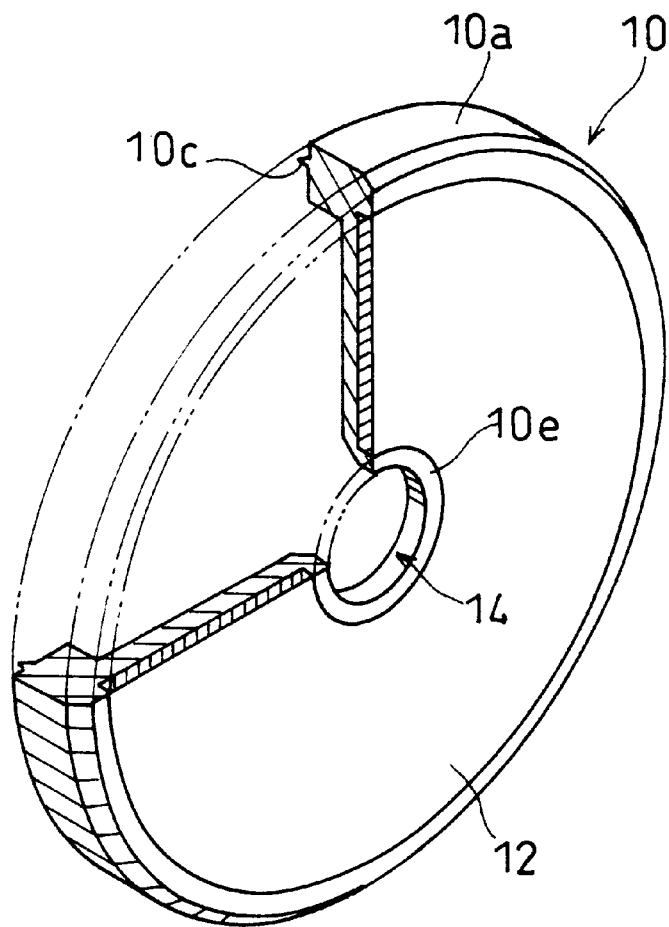
FIG. 2(b) is a perspective view showing the appearance of the disk-use hub one portion of which is exploded.

FIGS. 2(a) and 2(b) schematically show a disk hub 10 that is attached to a disk 2 of 130 mm (5.25 inch). Here, the members that have the same functions as those used in the above-mentioned disk hub 10 attached to the disk 2 of 90 mm are indicated by the same reference numbers.

The disk hub 10 is constituted of a hub's main body 10a, an energy director 10c, and a peripheral portion 10e that forms a center hole 14 to which a spindle 11 is inserted, as is shown in FIGS. 3(a) and 3(b). Here, these components are integrally molded from hard synthetic resin such as, for example, polycarbonate resin as one part by injection molding. Further, a magnetic plate 12, made of a magnetic metal such as, for example, SUS (Stainless Steel)-430, is inserted into the hub's main body 10a during its molding process.

Referring to FIGS. 3(a) and 3(b), the following description will discuss processes during which the magneto-optical disk cartridge C is placed into the disk driving device 20.

When the magneto-optical disk cartridge C is inserted into the cartridge entrance (not shown) of the disk driving device 20 from its front portion, simultaneously as the same positioning operation as that carried out conventionally, the disk hub 10, provided in the center of the disk 2 that has been housed in the magneto-optical disk cartridge C, is allowed to fit to the spindle 11 that is provided in the disk driving device 20 in the following manner.

First, as illustrated in FIG. 3(a), the magnetic plate 12, which is attached to the disk hub 10 of the disk 2 that is located in a disk-housing space inside the cartridge case 1, is attracted to a magnet 13 that is attached to the spindle 11, and then the center hole 14 of the disk-use hub 10 is inserted into the spindle 11. In this case, the disk 2, which is placed in the disk-housing space inside the cartridge case 1, is allowed to slide into the spindle 11, while the center hole 14 is being aligned by the tip of the spindle 11. Consequently, as illustrated in FIG. 3(b), the disk 2 comes into contact with a disk clamp 15 that is fitted into the spindle 11, thereby completing the inserting operation.

After completion of the inserting operation of the magneto-optical disk cartridge C, the spindle 11 and the disk clamp 15 fitted to the spindle 11 are allowed to rotate. Then, the rotational driving force of the spindle 11 is transmitted to the disk 2 that is being pressed against the disk clamp 15 by a magnetic force, and the disk 2 rotates at a predetermined speed.

Here, the hard synthetic resin, used for injection molding of the disk hub 10, is made by blending a proper amount of fluororesin in fine powder form, such as poly-tetra-fluoroethylene (PTFE), with polycarbonate resin that forms a base material. Thus, friction resistance to the spindle 11 can be reduced. Moreover, since poly-tetra-fluoroethylene (PTFE) is easily available at comparatively low costs, it becomes possible to provide disk hubs at comparatively low costs.

Figure 4:
FIG. 4 is an electron-microscopic photograph of a resin by which the disk hub is formed.
Figure 5A:
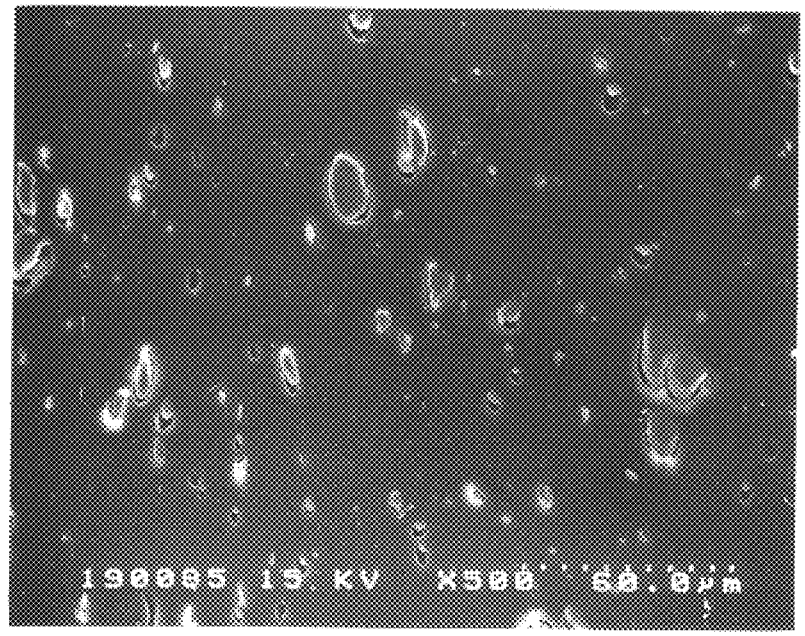
FIGS. 5(a) and 5(b) show electron-microscopic photographs of the resin in which the enlargement ratio is increased in succession.
Figure 5B:
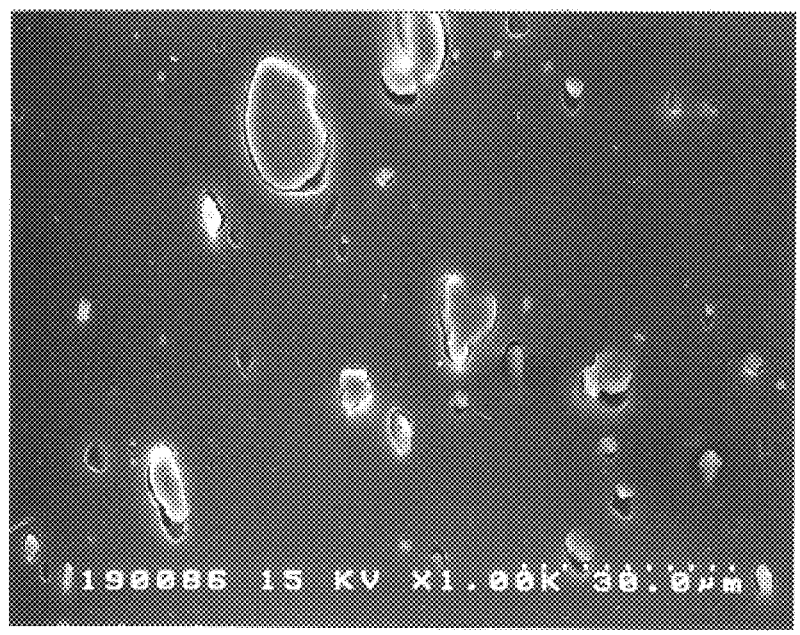

FIGS. 4, 5(a) and 5(b) show electron-microscopic photographs of the surface of the hard synthetic resin that is made by blending the fluororesin in fine powder form with the polycarbonate resin. These photographs indicate that the fluororesin is dispersed in the base material in a manner that resembles a group of islands.

Here, fluororesins are a material that is inherently difficult to be ultrasonically joined. However, since the fluororesin is dispersed in the base material of polycarbonate resin in a manner that resembles a group of islands, the contact between the polycarbonate resin of the energy director 10c, as is shown in FIG. 1(a), and the polycarbonate resin of the disk 2 is maintained sufficiently. As a result, if the content of the fluororesin is properly adjusted, then both of the parts can be positively joined to each other by the ultrasonic joining process.

Figure 6:
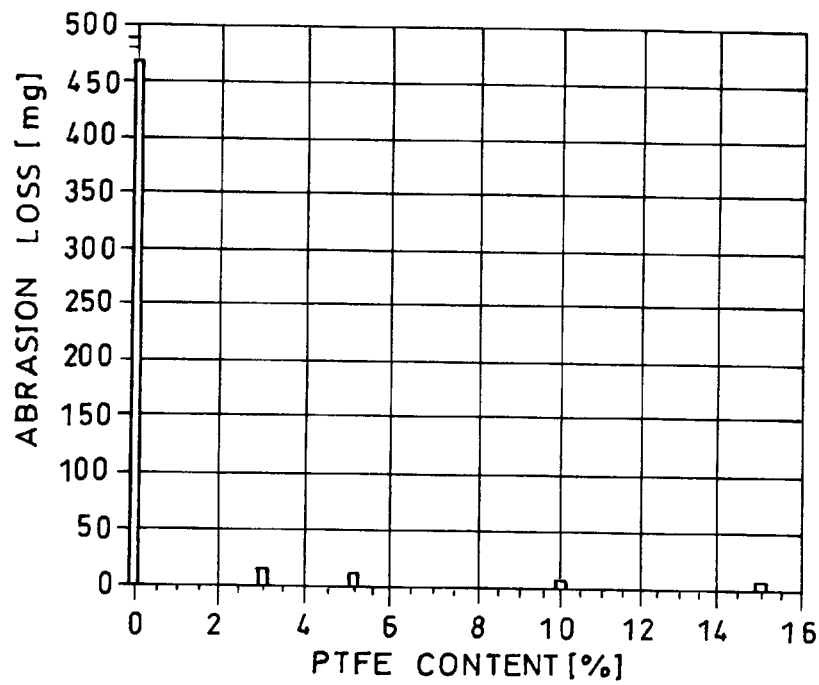
FIG. 6 is a graph that shows the relationship between the content of poly-tetra-fluoroethylene and the abrasion loss of a disk hub.

FIG. 6 is a graph that shows the results of measurements that were carried out to find the relationship between the content of the poly-tetra-fluoroethylene (PTFE) in percent by weight to the hard synthetic resin and the abrasion loss of the disk hub 10, in accordance with the standard of the reference of JIS (Japanese Industrial Standard)-7128A. FIG. 6 indicates that the blending of poly-tetra-fluoroethylene (PTFE) reduces the abrasion loss of the disk hub 10 to a great degree in comparison with the case without the blending (content 0%), regardless of the degree of the content.

Figure 7:
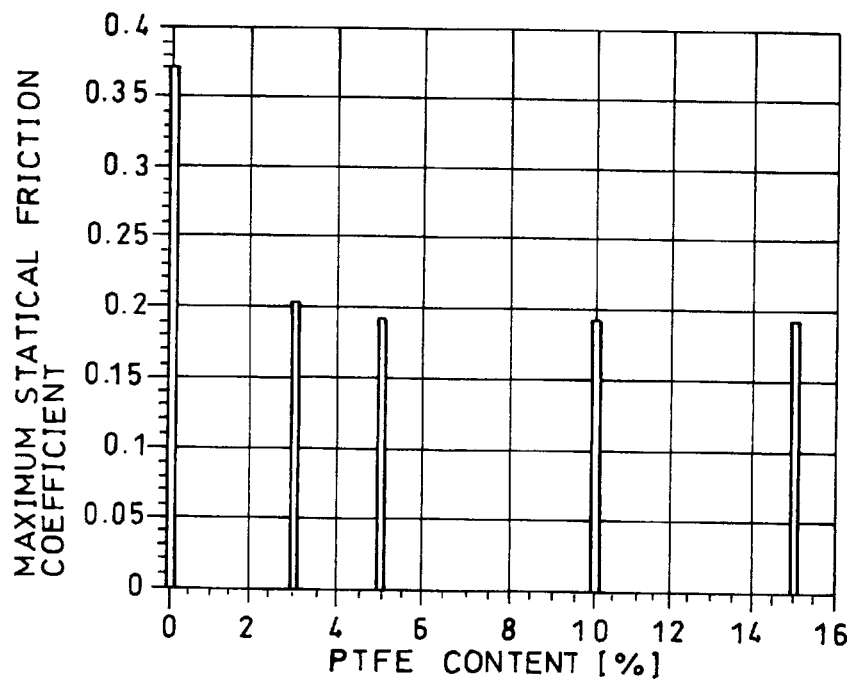
FIG. 7 is a graph that shows the relationship between the content of poly-tetra-fluoroethylene and the maximum statical friction coefficient of the disk hub.

Moreover, FIG. 7 is a graph that shows the relationship between the content of the poly-tetra-fluoroethylene (PTFE)

in percent by weight to the hard synthetic resin and the maximum statical friction coefficient of the disk hub 10. FIG. 7 indicates that the blending of poly-tetra-fluoroethylene (PTFE) positively reduces the maximum statical friction coefficient of the disk hub 10 in comparison with the case without the blending (content 0%).

Figure 8:
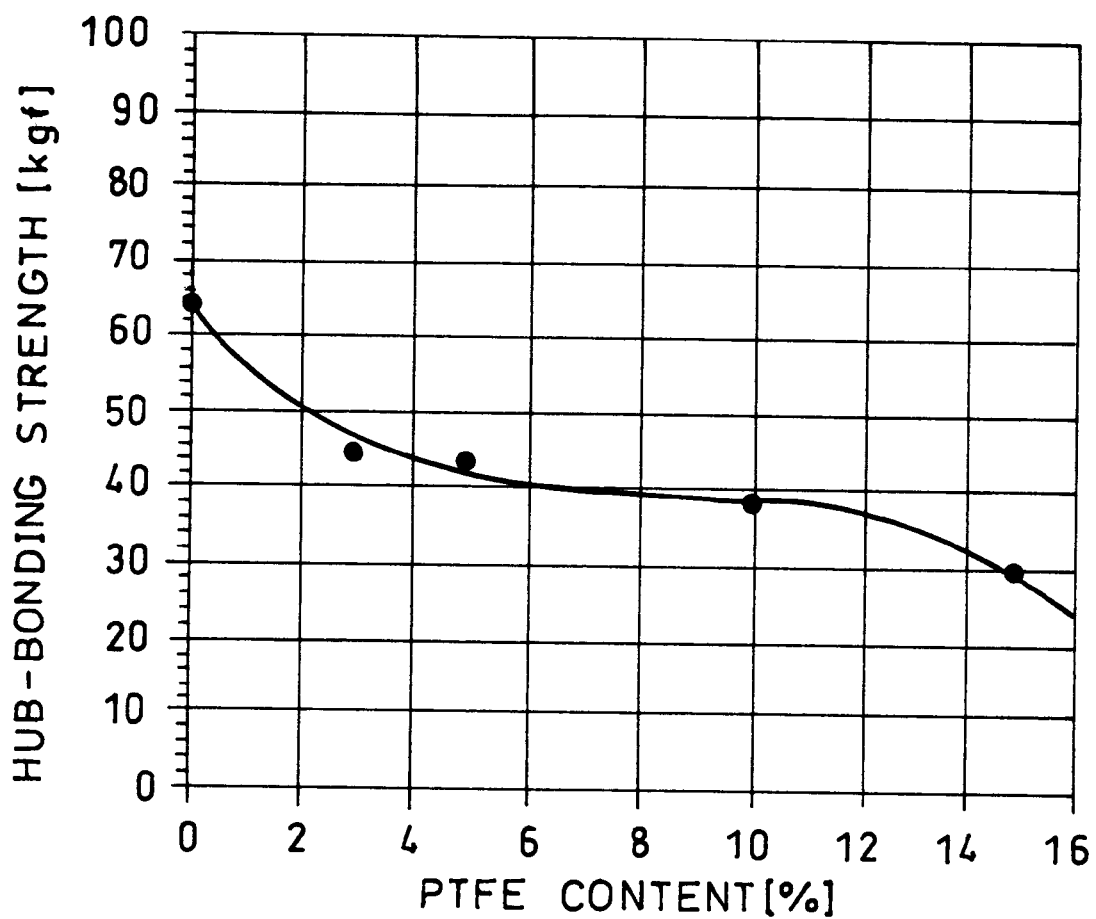
FIG. 8 is a graph that shows the relationship between the content of poly-tetra-fluoroethylene and the bonding strength of the disk hub with respect to the disk.
Figure 10A:
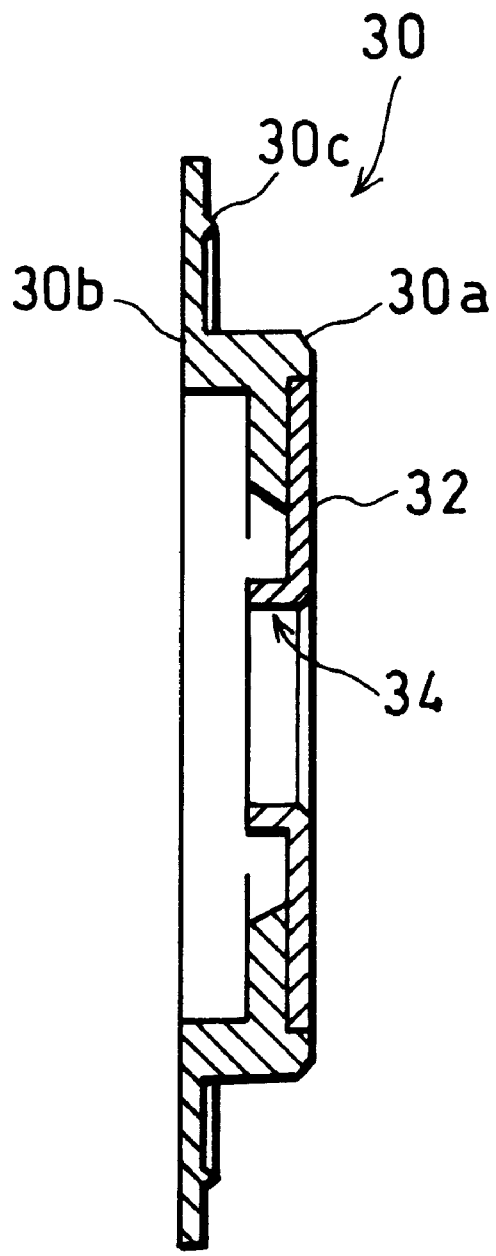
FIG. 10(a) is a longitudinal cross-sectional view of a conventional disk hub.
Figure 10B:
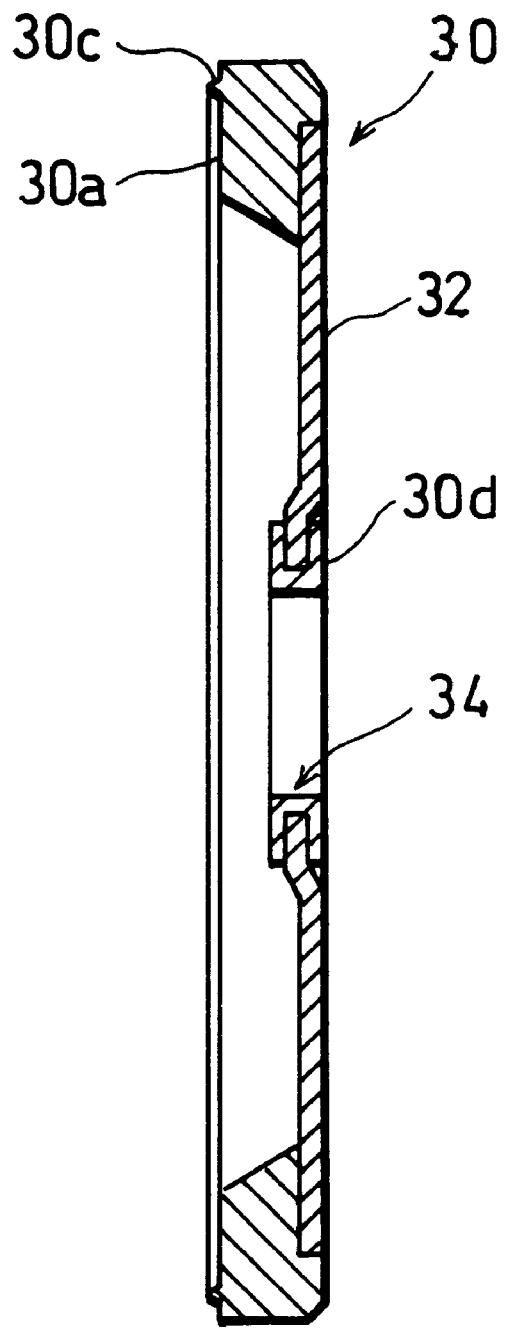
FIG. 10(b) is a longitudinal cross-sectional view of another conventional disk hub.

Furthermore, FIG. 8 is a graph that shows the relationship between the content of poly-tetra-fluoroethylene (PTFE) in percent by weight to the hard synthetic resin and the ultrasonic joining strength (hereinafter, referred to as the hub-bonding strength) of the disk hub 10 with respect to the disk 2. FIG. 8 indicates that when the content of poly-tetra-fluoroethylene (PTFE) exceeds 10%, the ultrasonical joining becomes unstable, thereby reducing the hub-bonding strength to a great degree.

The results show that, if the content X of poly-tetra-fluoroethylene (PTFE) is set within $0<X\leq10$ [%], and more preferably within $0<X\leq5$ [%], it becomes possible to maintain a sufficient hub-bonding strength, while reducing the abrasion loss as well as decreasing the maximum statical friction coefficient.

Moreover, when the spindle 11 of the disk driving device is coated with fluororesin, such as poly-tetra-fluoroethylene (PTFE), that serves as a abrasion-resistant resin, the friction resistance between the spindle 11 and the center hole 14 of the disk-use hub 10 can be further reduced. In this case, if the content x of poly-tetra-fluoroethylene (PTFE) is set within $0<X<3$ [%], it becomes possible to maintain higher hub-bonding strength, while decreasing the friction resistance of the circumferential portion 10e of the center hole 14.

As described above, the present invention makes it possible to provide a disk-use hub 10 which can reduce abrasion of its center hole 14 and which is easily processed and manufactured at low costs. Moreover, the present invention also makes it possible to provide a disk cartridge with high performances that houses a disk 2 having the disk hub 10 in its cartridge case 1, as well as a disk driving device 20 that desirably drives the disk 2.

Additionally, although explanation was made on the magneto-optical disk cartridge in the present embodiment, the present invention is commonly applicable to optical disks or magnetic disks.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A disk hub comprising:

a hub main body to which a magnetic plate is attached;

an energy director for ultrasonically joining the hub main body to a disk; and a center hole to which a disk drive spindle is inserted, wherein the hub main body, the energy director and a circumferential edge of the center hole are integrally molded from a hard synthetic resin with which a fluororesin, which is an abrasion-resistant resin in fine powder form, is blended and wherein the content X of the fluororesin is set within $0<X\leq10(\%)$ in percent by weight to the hard synthetic resin, said fluororesin being dispersed in said hard synthetic resin in a manner that resembles a group of islands.

2. The disk hub as defined in claim 1, wherein the content X of the fluororesin is set within $0<X\leq5$ in percent by weight to the hard synthetic resin.

3. The disk hub as defined in claim 1, wherein the fluororesin is poly-tetra-fluoroethylene.

4. The disk hud of claim 1, wherein said hub main body and said energy director include no magnetic material.

5. A disk driving device for driving a disk provided with a disk hub comprising a hub main body to which a magnetic plate is attached, an energy director for ultrasonically joining the hub main body to the disk, and a center hole to which a disk drive spindle is inserted, the hub main body, the energy director and a circumferential edge of the center hole being integrally molded from a hard synthetic resin, the disk hub being ultrasonically joined to the disk through the energy director, wherein a fluororesin, which is an abrasion resistant resin in fine powder form, is blended with the hard synthetic resin, the content X of the fluororesin being set within $0<X\leq3(\%)$ in percent by weight to the hard synthetic resin, said fluororesin being dispersed in said hard synthetic resin in a manner that resembles a group of islands and wherein a disk drive spindle, which is inserted into the center hole, is coated with the fluororesin.

6. The disk driving device as defined in claim 5, wherein the fluororesin is poly-tetra-fluoroethylene.

7. The disk driving device of claim 5, wherein said hub main body and said energy director include no magnetic material.

8. A disk cartridge comprising:

a cartridge case which houses a disk provided with a disk hub, wherein said disk hub includes a hub main body to which a magnetic plate is attached;

an energy director for ultrasonically joining the hub main body to a disk; and a center hole to which a disk drive spindle is inserted, wherein the hub main body, the energy director and a circumferential edge of the center hole are integrally molded from a hard synthetic resin with which a fluororesin, which is an abrasion-resistant resin in fine powder form, is blended and wherein the content X of the fluororesin is set within $0<X\leq10(\%)$ in percent by weight to the hard synthetic resin, said fluororesin being dispersed in said hard synthetic resin in a manner that resembles a group of islands.

9. The disk cartridge of claim 8, wherein the content X of the fluororesin is set within $0<X\leq5$ in percent by weight to the hard synthetic resin.

10. The disk cartridge of claim 8, wherein the fluororesin is poly-tetra-fluoroethylene.

11. The disk cartridge of claim 8, wherein said hub main body and said energy director include no magnetic material.

* * * * *